INVENTORS
ROBERT GLENN BROWN
BURTON NATHANIEL DERICK
JON OVITT STANLEY
JOHN MAULDIN WATKINS, JR.

BY

*Harry O. Braddock*
ATTORNEY

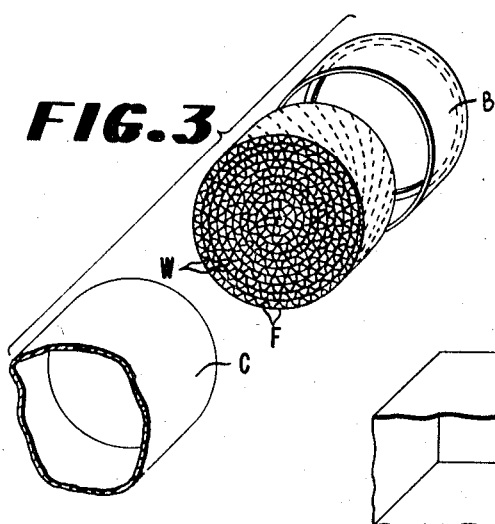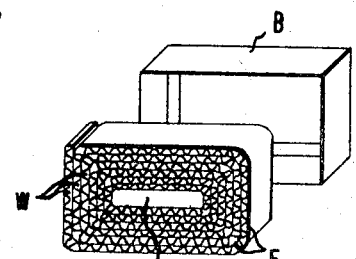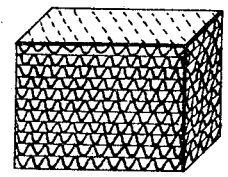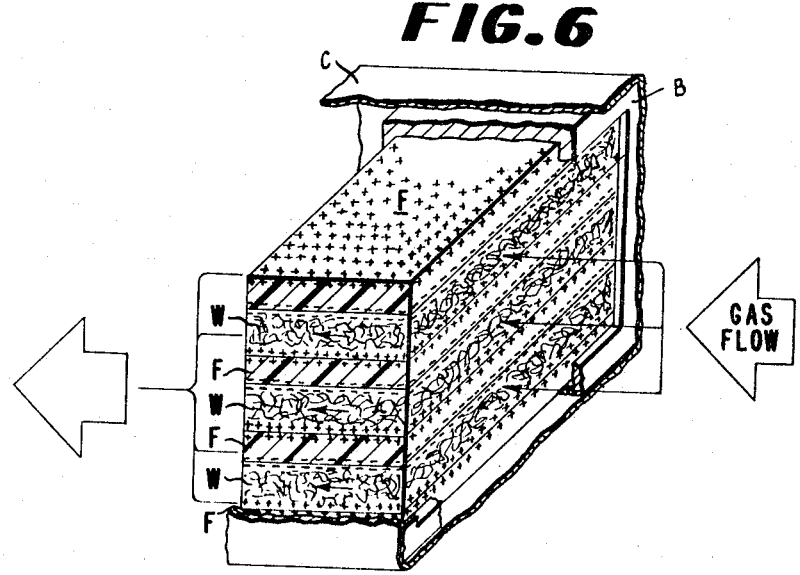

Dec. 29, 1970         R. G. BROWN ET AL         3,550,257
APPARATUS AND METHOD FOR FABRICATING A FILTER UNIT
Original Filed March 26, 1965         5 Sheets-Sheet 4
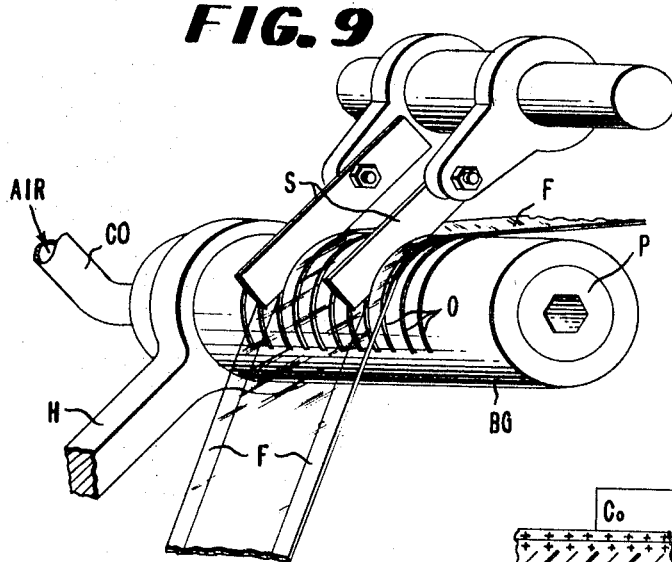
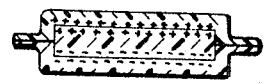
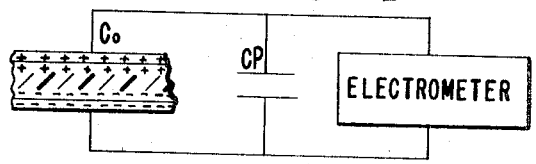
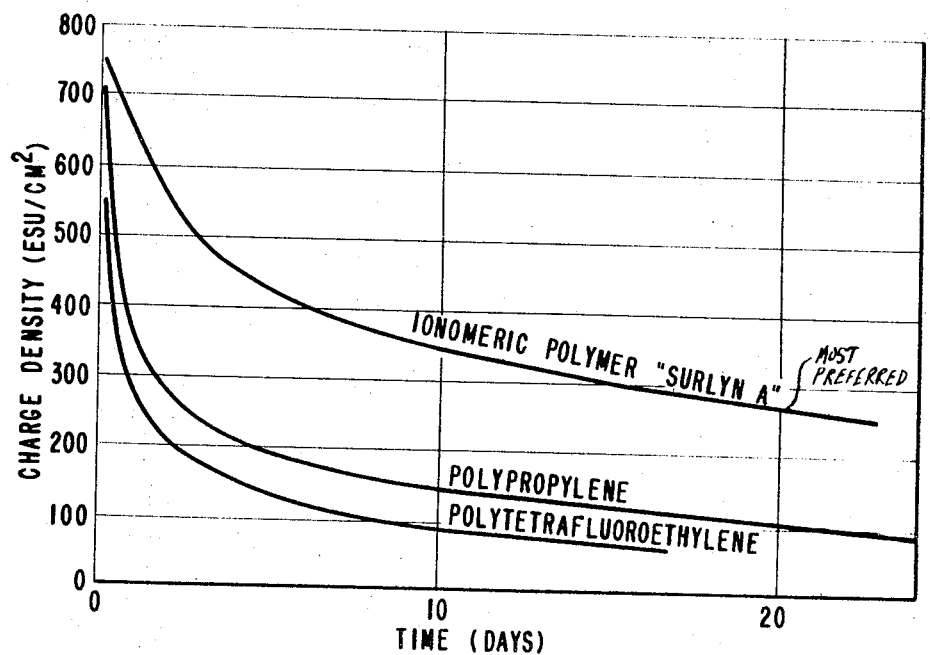
INVENTORS
ROBERT GLENN BROWN
BURTON NATHANIEL DERICK
JON OVITT STANLEY
JOHN MAULDIN WATKINS, JR.
BY
*Harry E. Braddock*
ATTORNEY

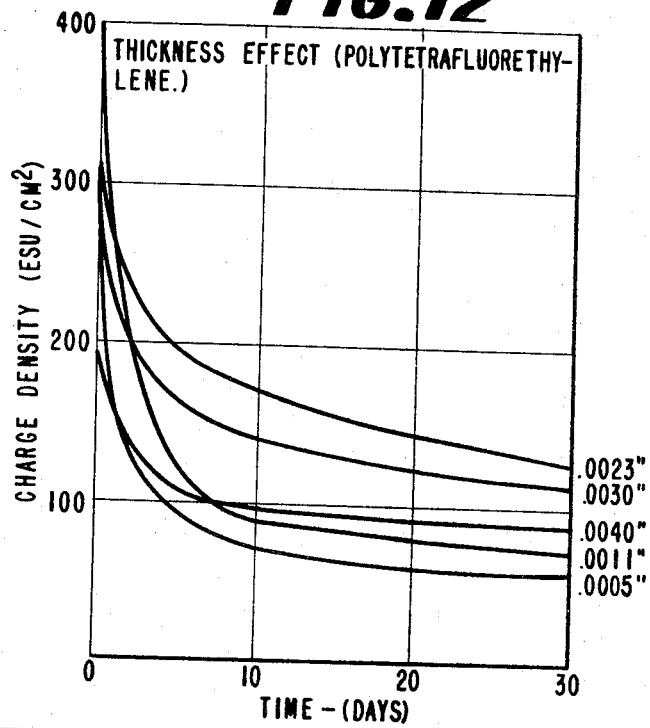
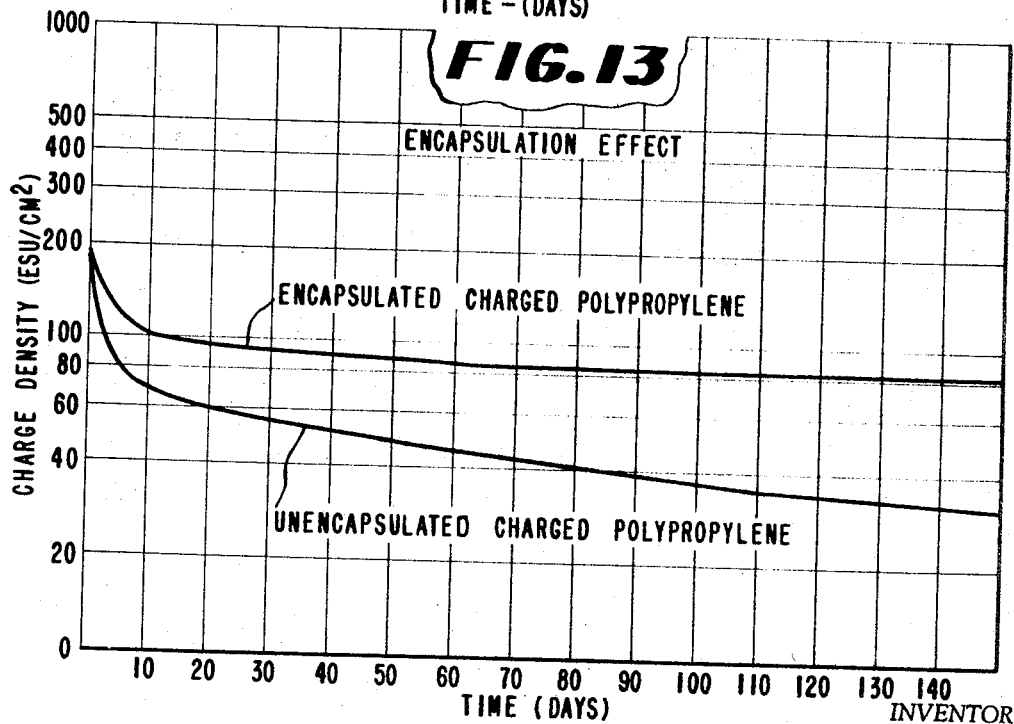

United States Patent Office 3,550,257
Patented Dec. 29, 1970

3,550,257
APPARATUS AND METHOD FOR FABRICATING A FILTER UNIT
Robert Glenn Brown, Burton Nathaniel Derick, Jon Ovitt Stanley, and John Mauldin Watkins, Jr., Wilmington, Del., assignors to E. I. du Pont de Nemours and Company, Wilmington, Del., a corporation of Delaware
Original application Mar. 26, 1965, Ser. No. 443,040, now Patent No. 3,487,610, dated Jan. 6, 1970. Divided and this application Apr. 16, 1969, Ser. No. 839,111
Int. Cl. H01s 4/00
U.S. Cl. 29—592
2 Claims

ABSTRACT OF THE DISCLOSURE

A high efficiency gas filter unit for separating charged and uncharged fine particles together with a manufacturing arrangement therefor. The filter unit does not require a separate power supply and comprises laminated structures of similar polymeric films each having an exceptionally high and stable positive electrostatic charge at one side thereof and a corresponding negative charge at the other.

---

This application is a division of application Ser. No. 443,040, filed Mar. 26, 1965, now Pat. No. 3,487,610, by the same inventors.

This invention relates generally to the field of electrostatically charged articles for use in electrical apparatus, especially such apparatus and processes useful in separating suspended small particles from gases. More specifically, the invention involves an improved high efficiency gas filtering combination for separating charged and uncharged fine particles preferably in the size range above about 0.01 micron in diameter from gas streams containing them, which combination utilizes a novel arrangement of a laminated structure of special sheets or strips, having a particular electrostatic charge condition maintained therein. Also involved is a novel, improved electrostatically charged article with enhanced charge capacity and charge stability for use in electrical apparatus and a method for preparing such articles.

The improved filter devices embodying the present invention are of particular value in the fields of air conditioning, heating, and ventilating systems. Filter devices utilizing electrostatically charged elements to remove particles from gaseous media are known in the prior art. However, these prior art devices usually either require an external electrical power supply to provide power continuously to the device, or the devices which do not have such a power supply do not achieve very high charge magnitudes and cannot maintain their charge condition long enough to give a reasonable operating life. In addition, many of the prior art filter devices of this type are of complicated, expensive construction, low efficiency, and produce an undesirable pressure drop or obstruction to flow of the gaseous media being treated.

It is an object of the invention to provide a novel improved gas filter device which overcomes the defects and deficiencies of the prior art devices, and performs at high efficiency to remove small particles from a gas stream utilizing an electrostatic collecting action yet requiring no electrical power supply.

It is another object to provide such an improved gas filter device of the electrostatically charged type which is capable of achieving very high charge densities and efficient operation for relatively long periods of use, and after long periods of storage; a filter device in which reduction of storage life and operating life due to neutralization of the effective electrostatic charge by gas ions as well as by charged particles, is minimized.

It is another object of this invention to provide such an improved gas filter device which is compact in size, simple in construction, economical, and easy to fabricate, operate, maintain, and service, yet effective and reliable in operation.

It is another object of this invention to provide an efficient, simple, and economical method for producing the novel, improved charged components and filter devices of this invention.

The main objects of the invention are achieved by a gas filter combination which generally comprises at least one sheet-like member each having a length and a width each significantly greater than its thickness, each said member having two major surfaces defined generally by the length and width of said member and spaced apart an amount equal to said thickness, each of said members constructed and arranged to form a laminated assembly, said arrangement further comprising supporting means cooperating with each of said members to maintain each of said members in said laminated assembly with their adjacent opposed major surfaces substantially equidistantly spaced from each other, said supporting means being pervious to gases to permit relatively free flow of gas in at least one direction between the adjacent opposed major surfaces of each of said members, each of said members formed of a polymeric composition having a very high electrical surface and volume resistivities sufficient to prevent significant dissipation of an electrostatic charge on and in said composition, having a high dielectric strength and having a low dielectric constant greater than that of air, each of said members having a positive electrostatic charge of high density on one of its major surfaces and in the member adjacent said one major surface, and each said member also having a negative electrostatic charge of high density on its other opposed major surface and in the member adjacent said other major surface, each of said members arranged in said laminated assembly so that each said major surface of one member having an electrostatic charge condition of one polarity is spaced from and opposed to a major surface of an adjacent member having an electrostatic charge condition of the opposite polarity, said members and said laminated assembly constructed and arranged to receive and conduct a gaseous stream in at least one direction through the space between each of said opposed surfaces having the opposite charge conditions thereon, the spacing between each of said oppositely charged surfaces and the density of said charges maintained such that significant electrical field effects exist throughout each said space sufficient to accomplish separation of charged and uncharged particles from a gaseous stream passing through said space, said thickness of each of said members, the magnitude of the electrostatic charge condition, the spacing between the oppositely charged surfaces, the dielectric constant of said composition, the resistivity of said composition and the dielectric constant of the gas stream treated, selected such that maximum charge densities can be achieved on said members, and such that collection of gas ions and charged particles from a gaseous stream passed through said space, and interaction of the charges of the members are prevented from significantly reducing the charge condition below the magnitude required for particle separation for appreciable periods of effective operating life and such that are discharges from said surfaces into such gaseous streams are prevented.

Other objects and advantages will appear from a consideration of the following specification and claims taken in conjunction with the accompanying drawings in which:

FIG. 3 is an exploded perspective view of a sheet-like dielectric member in a spiral-wound configuration, a supporting frame for the wound member, and a gas stream conduit of circular cross section in which the member and its supporting frame would be installed in accordance with the invention.

FIG. 4 is a view similar to that of FIG. 5 showing a dielectric member wound in a different configuration and provided with a different supporting frame for installation in a gas stream conduit of rectangular cross section in accordance with the invention.

FIG. 5 is a perspective view of another form of a filter device adapted for installation in a gas stream conduit of rectangular cross-section, the filter device comprising a plurality of sheet-like dielectric members arranged in a parallel laminated structure.

FIG. 6 is an enlarged partial perspective view of a preferred filter unit of this invention installed in a gas stream conduit, certain parts being shown in section and borken away for a clearer disclosure of the structure.

FIG. 9 is a partial perspective view of the dielectric strip which has been electrically charged in accordance with the invention moving over an air bearing unit and being cut to desired width by the strip slitter unit.

FIG. 10 is a transverse cross sectional view of a charged dielectric strip encapsulated or enveloped in another dielectric layer in accordance with a modification of the basic invention.

FIG. 11 is a graphical showing of the electrical charge retained by several materials against time.

FIG. 12 is a graphical showing of electrical charge retention of various strip thicknesses of the same strip material versus time.

FIG. 13 is a graphical showing of electrical charge retained for an encapsulated and an unencapsulated dielectric strip versus time.

FIG. 14 is a schematic showing of the circuit arrangement by which charge density on a charged film is determined.

Figure 1:
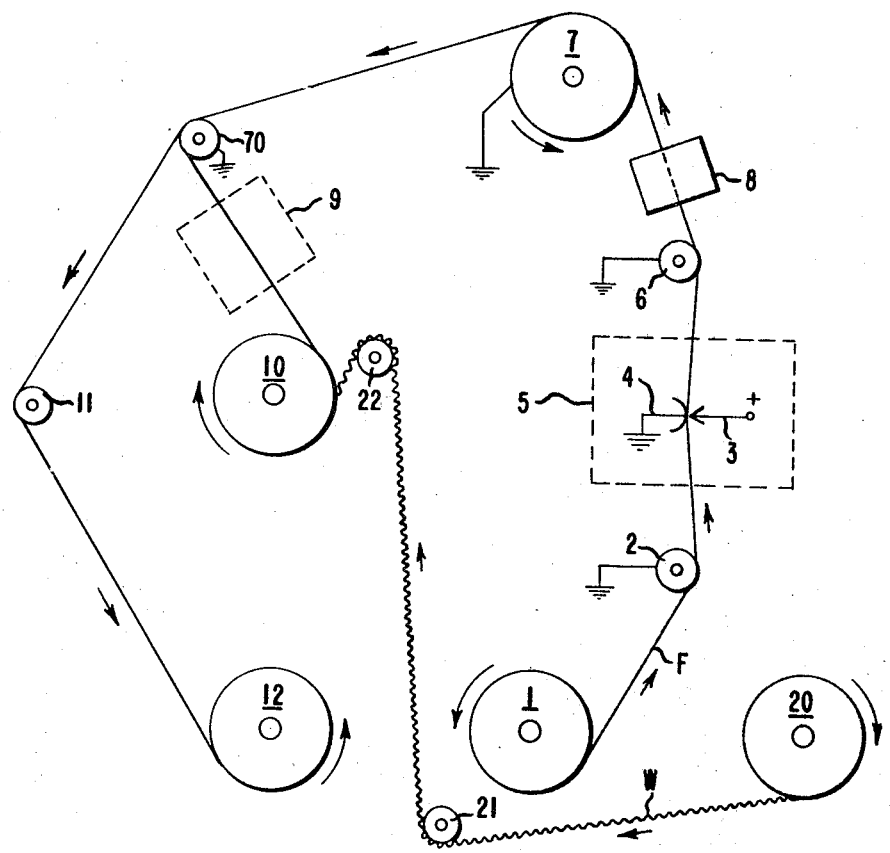
FIG. 1 is a schematic or diagrammatic view of an arrangement for fabricating one version of a filter device embodying principles of this invention.

Fundamentally, the filter arrangement of this invention comprises a laminated structure made up of a plurality of spaced sheet-like portions of dielectric material, the major surfaces of which are maintained substantially equidistantly spaced from each other. The sheet-like portions of dielectric material may be formed from one or more sheet-like members and are maintained in their equidistant spacing by suitable means, such as for example, interleaved sheets of gas pervious, corrugated, open-celled porous, or fibrous material. A gaseous stream with particles to be removed is passed between the spaced sheet-like portions of the dielectric material. The removal of charged and uncharged particles from the gaseous stream passed between these sheet-like portions of dielectric material is accomplished by the action of electrical fields existing between electrostatic charges of opposite polarity which charges are maintained on the opposing surfaces of the dielectric portions and in the dielectric material adjacent and along these surfaces. The electrostatically charged condition on the opposed surfaces of the dielectric portions and in the material adjacent these surfaces is of a very high charge density, is very stable, and capable of being maintained at a high effective level for long periods of time. The charged condition in and near the surfaces of the dielectric portions and the fields related thereto are generally uniform, but are sufficiently non-uniform with respect to the direction of flow of the gaseous stream so that not only charged particles are repelled or attracted into adhering engagement with the sheet-like portions of the dielectric material for removal from the stream, but uncharged particles are removed also by having charges induced thereon by the non-uniform aspects of the field in a known manner.

The nature of the dielectric material forming the sheet-like members for filters, the dimensions of these members, the spacing between the sheet-like members of the dielectric, the magnitude, polarity and distributions of the electrostatic charges, and the nature of the gaseous stream itself must be carefully determined to achieve the optimum desired improved filtration results.

The dielectric material of which the sheet-like portions or filter members are formed must possess very high surface and volume resistivities under storage and use conditions so that significant current flow and/or dissipation of the charges created thereon and therein will be prevented. The surface and volume resistivities, as determined according to standard ASTM D-257-61 test procedure, each should be in ohms and ohm-cm. respectively, on the average, at least about $10^{12}$ in air and preferably at least about $10^{14}$. The dielectric material should possess a high dielectric strength, preferably above about 300 volts per mil. The dielectric material must possess a relatively low dielectric constant yet significantly greater than that of air, preferably in the range of from about 2 to about 4 as determined by ASTM test methods at room temperature under standard conditions. Polymeric compositions having these properties are generally satisfactory, and preferably such compositions are also of film-forming molecular weights. Variations in charge retention for certain materials or compositions are shown in FIG. 11. The high resistivity property requires that the composition be free of additives or finishes which would significantly increase conductivity. The sheet-like members of this dielectric composition are formed of solid phase material, generally homogeneous and of substantially uniform thickness. It is believed that the polymeric compositions used should also be thermoplastic, capable of deformation under stress with some finite rate of recovery from such stresses and deformations. In addition, the sheet-like filter members have a length and a width each significantly greater than their thickness to provide two opposed equidistant major surfaces on each member. A preferred range of dielectric member thickness lies between about .001 inch and about .005 inch, the minimum width for most household and industrial applications being about ¼ inch. The variations in charge retention for various thicknesses of a dielectric member formed of polytetrafluoromethylene is shown in FIG. 12. However, for special applications such as surgical masks widths of about ⅛ inch are satisfactory. The laminated filter structure can be formed by winding or wrapping an elongated sheet-like dielectric member as indicated in FIGS. 3 and 4, or it can be formed by stacking a plurality of sheet-like dielectric members as shown in FIGS. 5 and 6. The spacing between the sheet-like dielectric members is substantially uniform and of a magnitude, relative to the density of the charges maintained in an on adjacent dielectric members, such that an effective field is created in substantially all of the space between the members. A preferred range for this spacing is between about .001 inch and about .075 inch for most household and industrial applications.

The exact nature of the very high charge created and maintained at and adjacent the major surfaces of the dielectric members and the reasons for its stability are not fully understood but are believed to be related not only to the composition and geometry of the laminated structure, but also to the results of the treatment of the members to be fully described hereinafter. A charged condition is created on each operative dielectric sheet-like member such that one major surface and the material of the member adjacent said one surface have an electrostatic charge of one polarity at a high charge density while the other major surface and the material of the member adjacent said other surface have an electrostatic charge of the opposite polarity at a high charge density. The density of this charge preferably is at least about 100 e.s.u./cm.$^2$. However, significant improvement in filtering efficiency is achieved with densities of as low as 25 e.s.u./cm.$^2$. The dielectric members are arranged so that the opposed major surfaces of adjacent dielectric members or portions of members possess charges of opposite polarity as shown in FIG. 6. The effectiveness of the sheet-like dielectric members in achieving and maintaining high charge densities has been satisfactorily maintained when the members have been biaxially oriented in the general plane of the members. This orientation may be desired to provide necessary strength during the fabrication and use of the filter devices and for other reasons.

The dissipation of charges carried by dielectric members formed of certain compositions is reduced by encapsulating or enclosing such charged members with a thin layer or sheet of an organic polymeric composition having characteristics and properties at least as good as (from the standpoint of performing satisfactorily in devices of this invention) the composition of which the dielectric members may be formed. Encapsulation not only improves charge retention but makes the filter unit more easily washable without significantly affecting the charge condition.

It is believed that the charges of one polarity at and adjacent one major surface of each dielectric sheet-like member are somewhat stabilized in position by the action of the charges of the other polarity at and adjacent the other major surface of the same sheet-like member. In addition, when the sheet-like members are positioned in the stacked spaced configuration of the assembled filter device, it is believed that the charges of one polarity at and adjacent one major surface of one of the sheet-like members also is stabilized in position by the action of the charges of the other polarity at and adjacent the opposed major surface of the next adjacent sheet-like member. Preferably, the thickness of the dielectric sheet-like members and the spacing between the members are controlled with respect to the dielectric constants of the dielectric composition and of the gas passing between the members so that a maximum stabilizing action is obtained on the charges of the members.

It appears that for a given material the high charge density which can be established is at least partly due to the charging process of the invention and to the stabilizing action discussed in the preceding paragraph. Also it is believed that this stabilizing action, plus the large amount of charge which can be carried by each member, makes possible long effective operating life for the filter device of this invention, and reduces significantly the rate of decay of the established charges under both storage and use conditions. A wide variation in desired storage and use life exists, depending on the specific case. A satisfactory storage life for a home air filtering unit for example would be about 3–6 months and a satisfactory service or use life would be about 6–12 months. On the other hand, a satisfactory storage life for a cigarette filter would be on the order of 1–2 months with a use life of several minutes.

Dissipation of the charges does occur, due, at least in part, to neutralization of the charged particles collected, which includes ions in the stream being filtered. However, due to the large magnitude of charge established and its relatively stable nature, the charge does not drop below effective filtering levels for long periods of use. It is believed that since the overall net charge on a given filter arrangement is about zero, attraction of ions from the ambient atmosphere during storage is minimized.

In addition to means for maintaining the desired spacing between the dielectric members, filter units of this invention usually further comprises a supporting frame or housing to form a unitary assembly and provide a convenient means for mounting the filter units in operative position relative to a gas stream to be filtered. The housing may also assist the laminated filter structure in resisting the force of the air stream being filtered. Obviously, the supporting frame or housing itself can be arranged to maintain the dielectric members in their desired positions and spacing.

The dimension of the dielectric sheet-like filter members which determines the length of travel of a gaseous stream through a given filter unit embodying the invention can be made very small, even for gaseous stream velocities through the filter of up to about 300–400 ft./min., a filter depth or stream travel through the filter of the order of about ⅛ inch to about 2 inches having been found adequate.

A number of materials have been used to form the gas pervious spacer strip W; for example, open celled polyurethane foam with from 30–100 pores per inch, thickness of from .030–.075 inch, and widths of from ½–1 inch have been used. Also mats or webs of glass fibers have been used with widths from ½–1 inch and varying thicknesses. The preferred spacer strip material is corrugated Kraft paper .01–.060 inch thick, ½–1 inch width and with the corrugations arranged so that the incoming gas stream is laterally deflected to produce sufficient turbulence to improve the filtration efficiency. These materials in these sizes have provided filter structures with pressure drop and gas velocity characteristics desirable for home and industrial heating and ventilation systems. The spacer strip should be formed of a very high resistance material and may have a wide variation in thickness depending on the efficiency and pressure drop desired for the overall filter arrangement. As the charged dielectric strip portions are moved close together by using thinner spacer strip portions, the filter pressure drop will increase since more mass is positioned in the gas stream. However, the filter efficiency will increase as the oppositely charged surfaces of adjacent dielectric strip members are brought closer together since this makes the electrical field greater in the space between them and provide higher forces on particles passing between the surfaces.

Usually a suitable first roughing filter about one inch wide and made, for example, of a web of loosely packed glass fibers is provided upstream of the filter unit of this invention to remove very large particles from the gas streams.

The general operation of the filter devices of this invention is believed to be clear. The laminated structures are positioned in a gaseous stream so that gas carrying particles is directed between the dielectric members, either through the porous, fibrous, or corrugated interleaved spacer members or through the open space between the dielectric members when different means are used to maintain their desired spacing. One such arrangement is shown in FIG. 6. The charged particles carried by the gaseous stream are attracted or repelled into engagement with the charged portions of the dielectric members and thus removed from the gaseous stream. The uncharged particles upon encountering the non-uniform aspects of the fields existing between the dielectric members, caused by the striated charge condition or other condition such as by non-uniform structure of the spacer strip members, have sufficient charges induced thereon to cause them to be attracted or repelled into engagement with the dielectric members and removed from the gaseous stream. The geometry of the filter structure and its high charge densities of relatively high stability accomplish a high efficiency filtering action with minimum restriction or pressure drop in the gaseous stream being treated.

Figure 2:
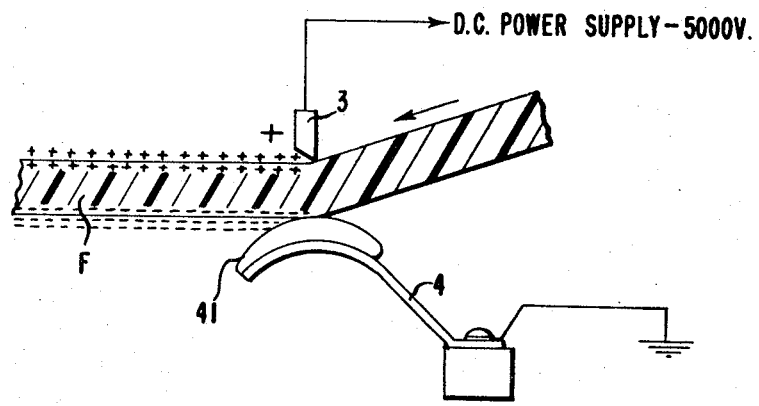
FIG. 2 is an enlarged partial schematic view showing a sheet-like member of the dielectric material being treated to create the desired electrical charge condition required for use in a filter device of this invention.

A general arrangement for producing the desired charge condition of the dielectric sheet-like members is shown schematically in FIG. 1. Since it is believed that the formation of the filter structure must be accomplished quickly after the desired charge condition has been established in the sheet-like members, the process for charging and forming the laminated structure is a continuous one. Preferably, the desired dielectric starting material is in the form of a continuous film or strip F supplied on a rotatable feed roll unit 1. The dielectric strip F under a controlled amount of tension is moved over a first air bearing device 2 and through a charging unit 5. In charging unit 5, the strip F is moved under tension against a knife-edged electrode 3 and past a grounded electrode 4 opposed to electrode 3 and in engagement with the film. Electrode 3 is connected to a suitable power supply (not shown) which maintains it at a D.C. potential approaching the dielectric break down strength of the plastic material or preferably of about 4000 volts for a 1 mil thick polypropylene strip. For a polypropylene strip .25 inch wide and .001 inch thick, moved at a speed of about 8 feet/second past the electrodes, a current drain on the power supply, which is at 4 kv., of about 5 microamperes occurs. An enlarged view of the electrodes in cooperation with a dielectric strip being charged is shown in FIG. 2. As shown in FIG. 2, negative electrode 4 comprises a grounded metal element 4 carrying a pad 41 which can be constructed of leather saturated with a colloidal graphite solution. Electrode elements in the form of metal wire brushes may also be used to engage and charge the dielectric strip. Although the details of the charged condition are not fully understood, it is believed that a charge condition generally as shown in FIG. 2 is created in the tensioned or stressed dielectric strip or member F. The strip surface which engages the positively charged knife-edge electrode 3, and the adjacent strip material to some depth along this surface becomes very highly positively charged. The opposed surface and its adjacent material becomes very highly negatively charged. Since a strip surface polarity is the same as that of its engaged charging electrode element, it is believed that the charge is a trapped or injected one rather than an induced charge. It has been observed that this treatment creates a charge condition which has a pattern which is somewhat striated along the length of the strip F. This striated pattern, which in the final filter structure extends transversely of the direction of the gas stream being treated is believed to result in non-uniform field effects which contribute to effective separation of uncharged particles. Strip F moves from charging unit 5 over another air bearing device 6 to a strip slitter or width control unit 8 which makes the necessary longitudinal cuts to produce the desired final strip width, and then to a drive wheel unit 7. FIG. 9 illustrates a slitter unit and an air bearing unit associated therewith. From drive wheel unit 7, the strip moves over another air bearing device 70 and then is combined with a continuous gas pervious spacer strip W supplied over air bearing devices 22 and 21 from feed roll unit 20. The combined strips F and W are wound up together at windup roll unit 10. The waste trimmed from strip F is moved over bearing device 11 and wound up on waste take-up roll unit 12.

The charged strip should be engaged and supported between the charging position and the windup position only by means at the same potential as the particular surface engaged or supported in order to prevent charge dissipation. For example, if one electrode is at ground potential, the surface charged by that electrode may be engaged by grounded support means without dissipating the charge. However, it is preferred that the charged film be supported by air bearings or where drive wheels are required, such should be coated with a suitable insulating material.

If desired for the purpose of enhancing the stability of charge on the strip F, an encapsulating layer of dielectric material can be applied to strip F by a unit shown at 9. Strip F may be encapsulated by continuously bringing together two wider strips on either side of strip F and then heat sealing the side edges of the wider strips. For example, two opposed power sealer units sold under the tradename "Doughboy" and of the type referred to in U.S. Pats. 2,566,799 and 2,658,552 have been used successfully for this purpose. A transverse cross section of a dielectric strip encapsulated in this manner is shown in FIG. 10 and an indication of the difference in charge retention due to encapsulation can be seen in FIG. 13. The laminated structure wound up at windup roll unit 10 may be wound on a replaceable core unit which forms a part of the final filter structure, such as element P in FIG. 4. A suitable supporting frame or housing may be added to complete the filter units such as shown in FIGS. 3 and 4. Alternatively, the wound structure may be cut radially, flattened, and trimmed to form a linear laminated structure as shown in FIG. 5, which is provided if desired with a housing or supporting frame before use. It is believed desirable, if not necessary, to the formation of the improved filter devices of this invention, that the laminated structure be formed without significant delay after the creation of the desired charge condition in the tensioned or stressed dielectric strip or member F, so that the favorable charge maintaining, charge stabilizing effects of the filter geometry can be realized before appreciable charge dissipation occurs. No conducting path should be created between the oppositely charged surfaces of the same or adjacent members which would aid in dissipation of the charges.

The following conditions are indicated as desirable during the charging and fabrication process where the distance traversed to the strip between the charging position and the laminating position is less than about five feet:

Temperature—About 25° C. or less; preferably low.
Voltages—Up to dielectric breakdown strength of dielectric strip.
Pressure—Atmospheric or lower.
Strip speeds—About 30–60 feet/minute.
Humidity—0.5% Relative humidity.

The dielectric strip tension against knife edge may be varied from a significant level up to the tear strength of the strip.

One representative embodiment of the invention involves the use of polypropylene strip as the dielectric charge-carrying members in preparing a laminated filter structure according to the invention.

A narrow roll of commercially available polypropylene film as manufactured and sold by the Hercules Powder Company of Wilmington, Del., under the trade identification "Profax" B–101–100, was charged and assembled with various interleaved gas-pervious strip materials according to the arrangement shown in FIGS. 1 and 2 of the drawings to form a number of laminated filter structures. These filter structures, their charging conditions, and their performance under certain general test conditions are indicated in the following Table I. The propylene film was manufactured without any special additives or finishes and was one inch wide with balanced biaxial orientation of a relatively high degree of orientation. The face area of these filter units was about 2.5 square inches. The filter windup speed used was between 30–60 ft./min. with a distance of about 4 feet between the charging point and the windup point. Table I indicates generally the superiority of the charged filter units of the invention (as reflected in the low particle penetrations) relative to similar uncharged units, and relative to a conventional interception filter formed of a compressed mass of fine uncharged glass fibers (Filter No. 5).

The testing for the Table I comparison followed a standard method as described in the following texts: (1) "Handbook on Aerosols," Chapters from the Summary of Division 10 of the National Defense Research Committee, published by the U.S. Atomic Energy Commission, 1950, and (2) "Particulate Clouds, Dusts, Smokes, and Mists" by Green and Lane (E. F. Spon, Ltd., 1957). Standard 0.3 micron dioctyl phthalate (DOP) particles were used. Generally speaking, the test involves placing the filter to be tested in a controlled air stream contaminated with a controlled test dust. The air stream is sampled upstream and downstream of the test filter using an absolute filter for sample dust collection. Usually the absolute filter is examined with a photometer and the efficiency calculations are based upon the results of this examination. Other testing of filters can be done in accordance with a method identified with the National Bureau of Standards (NBS) and this method is described in an article by R. S. Dill at page 379 of Vol. 44 (1938) of "The American Society of Heating and Ventilation Engineers Transactions."

Another representative and preferred embodiment of the invention involves the use of materials known as ionomeric, or ionic, hydrocarbon polymers for constructing the dielectric charge-carrying members of which the filter units of the invention are constructed. Such materials are disclosed in the common assignees copending U.S. patent applications Ser. No. 271,477, filed Apr. 8, 1963, now Pat. No. 3,264,272, in the name of Richard Watkin Rees and Ser. No. 348,293, filed Feb. 28, 1964, now Pat. No. 3,404,134, also in the name of Richard Watkin Rees. In addition these materials are disclosed generally in Belgian Pat. No. 621,846.

Broadly, these materials may be described as ionically linked polymers formed by an alpha olefin and an alpha-beta ethylenically unsaturated acid containing 3 to 8 carbon atoms in which 10%–90% of the carboxylic groups are ionized in association with metal ions derived from Groups I, II, and III of the Periodic Table.

More specifically, the dielectric strip material is preferably one of the ionic copolymers of alpha olefins having the formula R—CH=CH$_2$, where R is a radical selected from the class consisting of hydrogen and alkyl radicals having from 1 to 8 carbon atoms, and alpha, beta-ethylenically unsaturated carboxylic acids having from 3–8 carbon atoms, said copolymers having from 10% to 90% of the carboxylic acid groups ionized by neutralization with metal ions uniformly distributed throughout the copolymer, said copolymer being a direct copolymer of the alpha olefins and the unsaturated carboxylic acid in which the carboxylic acid groups are randomly distributed over all molecules and in which the alpha-olefin content of the copolymer is at least 50 mol percent, based on the alpha olefin acid copolymer, and in which the unsaturated carboxylic acid content of the copolymer is from 0.2 to 25 mol percent, based on the alpha-olefin acid copolymer, and said metal ions having an ionized valence of from one to three inclusive when the unsaturated acid is a monocarboxylic acid and an ionized valence of one when said unsaturated acid is a dicarboxylic acid and said metal ions being selected from the group consisting of uncomplexed and complexed metal ions. The most preferred specific composition of this type has been a copolymer of ethylene and methacrylic acid neutralized with a salt of zinc or magnesium, with a weight percent methacrylic acid about 10%, with about 45% of the acid groups neutralized by the zinc or magnesium ions. This most preferred composition has shown melt index of the base polymer about 32.0 and a melt index for the blend about 1.4 (ASTM–1238–57T).

A film highly suitable for use as a dielectric filter member, according to this invention, can be prepared in the following manner, for example. A 50 g. batch of an ethylene/methacrylic acid copolymer containing 10 weight percent of methacrylic acid and having a melt index of 5.8 g./10 minutes is milled at a temperature of 125°–135° C. on a 6 inch rubber mill. To this is added gradually 6.3 g. of magnesium acetate (x4H$_2$O) in 25 ml. of water and the milling continued for 15 minutes by which time the evolutions of acetic acid ceases and a clear resilient product with a melt index of 0.12 g./10 minutes is formed, This product may be extruded through a suitable orifice under controlled conditions in a known manner by a conventional extruder apparatus to produce thin film strip which is taken off and wound up by other conventional apparatus.

Rolls of such ionomeric materials about 1 inch wide and 1.1 mil thick was charged and assembled with interleaved gas pervious strip material according to the arrangement shown in FIGS. 1 and 2 of the drawings to form a number of laminated filter structures having a face area of 2.4 square inches. These filter structures, their charging conditions, and their performance under certain general test conditions are indicated in Table II. Table II shows among other things a comparison of the filtering effect of a charged, laminated film-foam structure relative to a stacked foam structure.

In addition to polypropylene and the ionically linked copolymers mentioned in the preceding discussion, a number of other thermoplastic polymeric materials wtih gen-

TABLE I

| Filter No. | Construction | Charging voltage | DOP test conditions and results | | | |
|---|---|---|---|---|---|---|
| | | | Air velocity ft./sec. | DOP penetration, percent | Pressure drop, in. H$_2$O | Effectiveness factor |
| 1 | Alternating layers 1 mil thick polypropylene and 10 mil thick glass fiber web. | 5,000 | 31 | .054 | .142 | 53 |
| 2 | Alternating layers 1 mil thick polypropylene and 10 mil thick glass fiber web. | 0 | 31 | 22 | .135 | 11 |
| 3 | Alternating layers 1 mil thick polypropylene and 35-45 mil thick open cell polyurethane foam (60 pores/in.). | (¹) | 31 | 70 | .017 | 21 |
| 4 | Alternating layers 1 mil thick polypropylene and 35-45 mil thick open cell polyurethane foam (60 pores/in.) with high vacuum silicone grease seal to prevent leakage around unit. | 5,000 | 40 | 25 | .027 | 51 |
| 5 | Composite pad of non-woven glass fibers formed by compressing four one-inch thick conventional commercial air filters into a one-inch thickness. | (¹) | 40 | 90 | .012 | 9 |

¹ NOTE.—For Table I, the effectiveness factor = $\dfrac{-\log (\text{penetration percent})}{\text{pressure drop in inches of water}}$ erally similar properties of dielectric constant, dielectric strength, bulk and surface resistivities have been evaluated tributed between C and Co to produce a potential V at the electrometer. If the capacitances of C and Co are

TABLE II

| Construction | | Charge voltage | Initial stable charge density | DOP test conditions | | | | |
|---|---|---|---|---|---|---|---|---|
| | | | | Air velocity, ft./min. | Initial penetration, percent | Initial pressure drop, in. H²O | Final penetration | Final pressure drop |
| Filter No. | | | | | | | | |
| 7 | Alternating layers 1.1 mil thick ionomeric metarial and 30-35 mil thick open cell polyurethane foam (100 pores/in.). | 5,000 | | 45 | 15 | .06 | 90 days, 22% | 90 days, 0.6 in. H₂O. |
| 8 | Alternating layers 1.1 mil thick ionomeric material and 30-35 mil thick open cell polyurethane foam (60 pores/in.). | 4,000 | | 45 | 30 | .03 | 104 days, <35% | 104 days, .02 in. H₂O. |
| 9 | Stacked layers of 30-35 mil thick open cell polyurethane foam (60 pores/in.). | 0 | | 45 | 85 | .02 | | |
| 10 | Alternating layers 1.1 mil thick ionomeric material and 30-35 mil thick open cell polyurethane foam (60 pores/in.). | 7,000 | | ¹ 45 | | | 5 days, 28% | 5 days, .02 in. H₂O. |

¹ Electrostatic unit cm.².

from the standpoint of their ability to receive and retain high electrostatic charge densities in order to determine their suitability as dielectric filter component materials. The data resulting from this evaluation of materials believed suitable for use in filters of this invention are shown in the following Table III and in FIG. 11 of the drawings. It has been determined that encapsulation of a charged dielectric strip, as previously described, improves its charge retention propeties and it is believed that the materials such as those shown in Table III as having lower charge retentions can be thus up-graded in this respect to the point where they will have long effective lives as filter components.

The values of electrical properties generally are determined by ASTM methods at room temperature and standard conditions. These values, as is known, vary with temperature.

Figure 7:
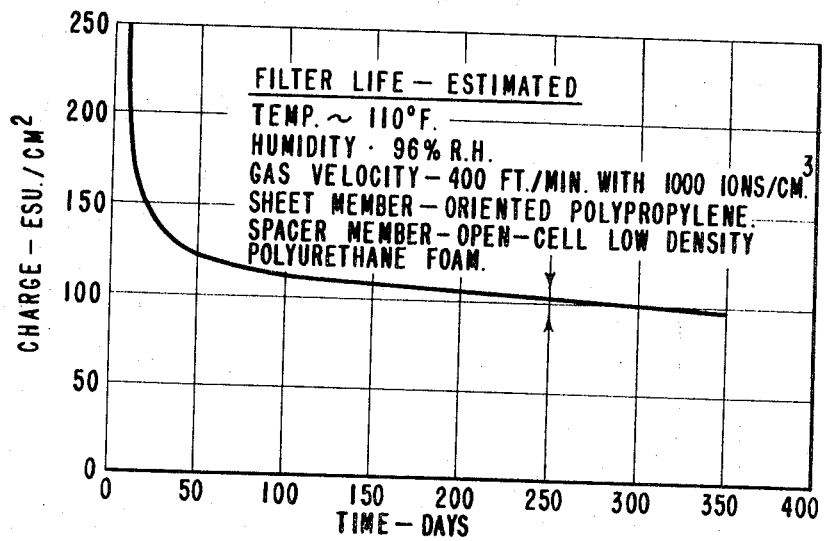
FIG. 7 is a graphical showing of the estimated amount of charge maintained on a filter device embodying principles of the present invention versus time in days.

The estimated filter life and retained charge magnitudes shown in FIG. 7 were calculated from charge retention evaluation of polypropylene strip under conditions comparable to those encountered by a filter unit (such as passage of ions at 400 ft./min. with 1000 ions/cm.³) and indicates that a useful filter life of one to two years is possible.

The charge density on the charged dielectric strip is measured using an electrical circuit arrangement as shown in FIG. 14. In this arrangement, a conventional electrometer is connected in parallel with capacitor C chosen to have a much larger value than the capacitance of the parallel plate capacitor Co, between the plates of which is placed a charged dielectric strip of thickness $t$ and surface charge density $d_0$. The charge $qo$, where $$d_0 = \frac{qo}{A}$$

(A=the area of the parallel plate capacitor Co), is distributed between C and Co to produce a potential V at the electrometer. If the capacitances of C and Co are known and V is measured, then $qo = (Co+C)V$ from which the surface density on the dielectric strip is calculated using the following equation $$d_0 = \frac{(Co+C)V}{A}$$

Figure 8:
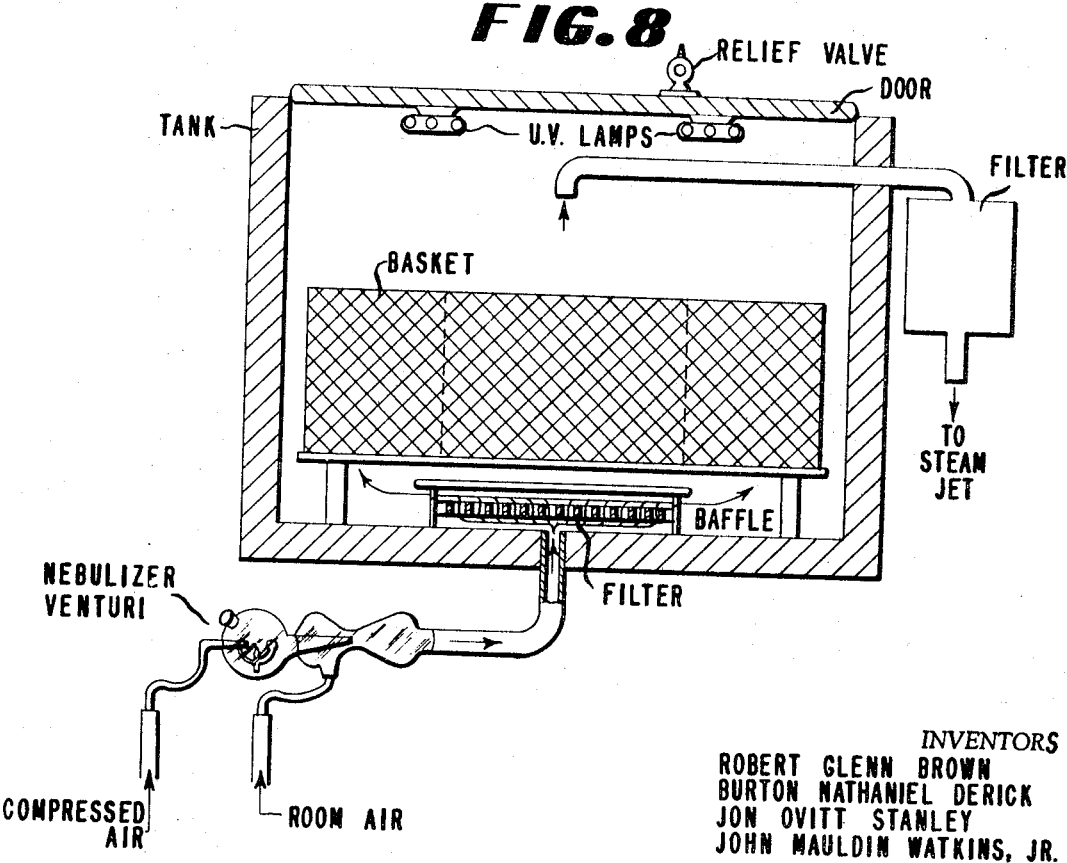
FIG. 8 is a schematic sectional side elevational view of a test apparatus incorporating a filter embodying principles of this invention, and used to establish the effectiveness of the filter in removing virus aerosol particles from an air stream supplied to test animals.

Certain additional information regarding the filtering capabilities of the filter devices identified by Nos. 1-5 embodying the present invention were determined by testing these filters for their ability to remove infectious virus aerosol particles from a heavily contaminated air stream utilizing a conventional test apparatus arrangement shown in FIG. 8. The apparatus of FIG. 8 is known as Middlebrook Airborne Infection Apparatus and comprises a fluid-tight tank with a fluid-tight access door, an air-stream inlet and an air-stream outlet. U.V. lamps are provided for decontamination of the tank, and the door is provided with the pressure relief means as shown. A wire basket for containing test animals such as mice, is supported in the tank, and an air filter is mounted in operative relationship to the tank air-stream inlet as shown in FIG. 8. Means are provided for moving a stream of air through the tank at a controlled rate and means are provided for controlled generation of aerosol particles in the air stream supplied to the tank.

A single 5-compartment wire basket was used with two mice in each compartment. The virus aerosol was generated in a Vaponefrin standard glass nebulizer sold by Thayer Labs., Inc., New York, N.Y., which is known to

TABLE III

| Material | Surface resistivity, ohm-cm. | Volume resistivity | Dielectric constant | Dielectric strength, volts/mil | Charge voltage | Initial retained charge, e.s.u./cm.² | Retained charge | |
|---|---|---|---|---|---|---|---|---|
| Propylene "Profax" B-101-100 thickness 1.2 mils. | 10¹⁶ | 10¹⁷ | 2-3 | 450 | 5,000 | 600 | 22 days, 120 e.s.u./cm.². | |
| Ionically linked copolymer ethylene/methacrylic acid neutralized with sodium, thickness 1 mil. | <10¹⁵ | >10¹⁶ | 2-3 | 350-400 | 4,000 | 750 | 28 days, 231 e.s.u./cm.². | |
| Polyethylene "Alathon" 7040 thickness 1.5 mils. | 10¹² | >10¹³ | 2-4 | 460 | 4,000 | 450 | 6 days, 6 e.s.u./cm.². | |
| Polyethylene terephthalate Mylar Type A, thickness 3 mils. | >10¹² | 10¹⁸ | 3-4 | 380-500 | 4,000 | 300 | 12 days, 78 e.s.u./cm.². | |
| Polytetrafluoroethylene, thickness 1 mil. | >10¹⁵ | >10¹⁵ | 2-3 | 480 | 4,000 | 260 | 55 days, 66 e.s.u./cm.². | |
| Propylene 1 mil "Profax" B-101-100. | 10¹⁶ | 10¹⁷ | 2-3 | 450 | 2,140 | 220 | 5 days, 80 e.s.u./cm.². | 14 days, 63 e.s.u./cm.². |
| Propylene 1 mil "Profax" B-101-100 encapsulated with "Profax" B-101-100 polypropylene. | 10¹⁶ | 10¹⁷ | 2-3 | 450 | 2,140 | 235 | 5 days, 105 e.s.u./cm.². | 14 days, 90 e.s.u./cm.². | generate particles predominantly 3 microns or less in size, the average size being about 1.8 micron means diameter. The same nebulizer was used for the generation of all aerosols so that the range of particle sizes from one run to another would be fairly constant. All of the aerosols were generated with an air pressure that provided a flow of 54 liters/minute through the orifice of the nebulizer.

The main air flow to the tank was 57.2 liters/minute giving a total air flow through the 1 inch diameter air inlet orifice in the tank bottom of 62.6 liters/minute. With a group of mice in the tank an influenza A, Strain S-15 virus aerosol (50% lethal dose) was generated for 30 minutes followed by a decay period of 30 minutes and a 15 minute period of decontamination with U.V. light. The group of mice were then removed from the tank, placed in the mouse batteries, 10 per cage and observed daily for a 14 day period. Fatalities were recorded and at the end of the 14 day period a mean survival day was calculated for each group of mice.

The filters previously identified by Nos. 1, 3, 4, and 5 and described in the preceding portions of this specification were tested in this arrangement.

The results are summarized in Table III and the more detailed data is given in Table IV. A review of this information indicates that Filter Nos. 1 and 4 are far superior to the uncharged laminated structure or the compressed glass fiber filter, Filter No. 1 being most effective in removing well over 90% of the virus aerosol droplet nuclei based upon the reduction in log units of virus. A comparison of the performances of filters 3 and 4 indicates the action of the charge placed on the polypropylene strips of the filter.

TABLE IV.—SUMMARY, FILTRATION OF INFLUENZA A, STRAIN S-15

| Filter | Fatalities, percent | Survivors, percent | Mean survival day | Percent reduction in virus aerosol particles |
|---|---|---|---|---|
| None | 100 | 0 | 5.5±.57 | |
| Filter No. 1 | 10 | 90 | 13.6±.46 | 98 |
| None | 100 | 0 | 6.1±.44 | |
| Filter No. 3 | 95 | 5 | 7.5±.68 | 49 |
| None | 100 | 0 | 5.3±.48 | |
| Filter No. 4 | 79 | 21 | 9.1±1.47 | 84 |
| Filter No. 5 | 100 | 0 | 5.7±.47 | 17 |

As an illustrative example of optimum filter life or effective operating and/or storage periods achievable by filter units embodying principles of this invention, a representative laminated filter unit prepared in accordance with this invention and specifically in accordance with FIGS. 1 and 2 of the drawings and utilizing the preferred ionically linked copolymer (unencapsulated) for the dielectric strips was given an initial charge density of 750–800 e.s.u./cm.$^2$ which gave initial DOP penetrations of about 26% and after storage in air for 150 days, the retained charge density was 165–190 e.s.u./cm.$^2$, an effective level for filtering which gave DOP penetration of about 31%. A similar filter unit prepared in the same manner and utilizing the preferred polypropylene composition (unencapsulated) for the dielectric strip was given an initial charge density of 650–700 e.s.u./cm.$^2$, which gave a DOP penetration of about 31%, and after 187 days, the retained charge density was 60–80 e.s.u./cm.$^2$, a satisfactory level for effective filtering action giving DOP penetration of about 50/. These charge densities are believed to be rather unusual since the prior art seems to indicate that the maximum surface charge density that can be sustained without breakdown of surrounding air is no more than about 8–10 e.s.u./cm.$^2$. A review of the prior art does not indicate that actual charge densities higher than 6–7 e.s.u./cm.$^2$ have ever been established for any appreciable length of time, if at all. The very high relatively stable charge densities of the filter unit of this invention are believed to be responsible in large measure for the sustained high efficiency filtering action of these units.

With respect to the home air heating field it is indicated in Tables I, II, IV, and V that the charged filter of this invention (No. 4) performs better (less particle penetrations) than four conventional commercial air filters of the glass fiber mat type (No. 5) in series, or a filter of the open cell foam type (No. 9) and thus represents a

TABLE V.—FILTRATION OF INFLUENZA A, STRAIN S-15

| Filter: | Cage No. | Fatalities | Survivors | Mean cage | Survival day, group | Virus in tank | Virus reduction Logs | Percent |
|---|---|---|---|---|---|---|---|---|
| Test No. 1-None | 1 | 10 | 0 | 5.9 | 5.5±.57 | 17.4 | | |
| | 2 | 10 | 0 | 4.6 | | | | |
| | 3 | 10 | 0 | 5.2 | | | | |
| | 4 | 10 | 0 | 6.0 | | | | |
| | 5 | 10 | 0 | 5.6 | | | | |
| Filter No. 1 | 6 | 1 | 9 | 13.8 | 13.6±.46 | .37 | 1.67 | 98 |
| | 7 | 0 | 10 | 14.0 | | | | |
| | 8 | 0 | 10 | 14.0 | | | | |
| | 9 | 2 | 8 | 12.9 | | | | |
| | 10 | 2 | 8 | 13.5 | | | | |
| Test No. 21—None | 1 | 10 | 0 | 5.9 | 6.1±.44 | 15.2 | | |
| | 2 | 10 | 0 | 5.8 | | | | |
| | 3 | 10 | 0 | 6.7 | | | | |
| | 4 | 10 | 0 | 6.0 | | | | |
| | 5 | 10 | 0 | 6.3 | | | | |
| | 6 | 10 | 0 | 6.2 | | | | |
| | 7 | 10 | 0 | 7.1 | | | | |
| | 8 | 10 | 0 | 6.1 | | | | |
| | 9 | 10 | 0 | 6.5 | 7.5±.68 | 7.79 | .289 | 49 |
| | 10 | 10 | 0 | 6.7 | | | | |
| | 11 | 9 | 1 | 7.9 | | | | |
| Filter No. 3 | 12 | 10 | 0 | 8.0 | | | | |
| | 13 | 10 | 0 | 6.9 | | | | |
| | 14 | 9 | 1 | 8.2 | | | | |
| | 15 | 9 | 1 | 7.9 | | | | |
| | 16 | 9 | 1 | 7.9 | | | | |
| Test No. 3—None | 1 | 10 | 0 | 6.1 | 5.3±.48 | 18.1 | | |
| | 2 | 10 | 0 | 5.7 | | | | |
| | 3 | 10 | 0 | 5.0 | | | | |
| | 4 | 10 | 0 | 5.5 | | | | |
| | 5 | 10 | 0 | 5.1 | | | | |
| | 6 | 10 | 0 | 4.9 | | | | |
| | 7 | 10 | 0 | 4.8 | | | | |
| | 8 | 6 | 4 | 10.6 | 9.1±1.47 | 2.97 | .78 | 84 |
| | 9 | 6 | 4 | 10.5 | | | | |
| | 10 | 8 | 2 | 9.2 | | | | |
| Filter No. 4 | 11 | 9 | 1 | 8.1 | | | | |
| | 12 | 7 | 3 | 9.8 | | | | |
| | 13 | 9 | 1 | 9.1 | | | | |
| | 14 | 10 | 0 | 6.4 | | | | |
| | 15 | 10 | 0 | 5.9 | 5.7±.47 | 14.97 | .08 | 17 |
| | 16 | 10 | 0 | 5.0 | | | | |
| | 17 | 10 | 0 | 5.6 | | | | |
| Filter No. 5 | 18 | 10 | 0 | 6.3 | | | | |
| | 19 | 10 | 0 | 5.9 | | | | |
| | 20 | 10 | 0 | 5.2 | | | | |
| | 21 | 10 | 0 | 6.1 | | | | | significant improvement in this respect, most especially as to the performance in removing the virus particles from air. It is felt that the filters of this invention also offer significant advantages over the electrostatic air filters which require a permanently connected external electrical power supply, such as is disclosed in U.S. Pat. No. 3,073,-094 to Landgraf, et al., and have a much more costly and complicated construction.

It is believed to be clear from the above description and discussion that applicants have provided a novel, useful, and improved filter arrangement in accordance with the objects of the invention.

Although a limited number of embodiments of the invention have been disclosed, many other embodiments and modifications within the spirit of the invention will be apparent to those skilled in the art and all such are considered to fall within the scope of the following claims.

What is claimed is:

1. A method for fabricating a laminated electrostatic filter unit component of improved charge capacity and charge stability comprising alternating dielectric layers and gas pervious spacer layers, said dielectric layers each having a length and a width each significantly greater than its thickness, each layer having two major surfaces defined generally the length and width of said layer, each of said layers having a positive electric charge of high density on one of its major surfaces and in said layer adjacent said one major surface, and each said layer also having a negative electrostatic charge of high density on its other opposed major surface and in the layer adjacent said other major surface, said method comprising in combination the following steps; continuously moving under tension, at a given velocity, and elongated sheet having two opposed major surfaces, and a predetermined thickness, said sheet formed of a given dielectric material with a given dielectric constant in a zone of controlled temperature, pressure, and humidity conditions, from a first position through a second position between two closely spaced electrode elements to a third position, while maintaining one of said sheet major surfaces in engagement with one of said electrode elements at said second position and maintaining the other surface of said sheet in close proximity with said other electrode element, and applying a predetermined high voltage across said electrode elements, said given dielectric material, said tension, said given velocity, said predetermined voltage and the engagement of said electrode elements with said sheet cooperating to establish a positive electrical charge of high density on said one major surface of said sheet and in the sheet material adjacent said one surface, and to establish a negative electrical charge of high density on the other major surface of said sheet and in the sheet material adjacent said other surface, said method further comprising, moving said charged sheet from said third position through a fourth position to a windup roll unit while simultaneously moving an elongated web of a predetermined thickness and gas pervious construction from a supply point at said given velocity into engagement with said other major surface of said dielectric sheet to form a composite two layer laminated structure at said fourth position, said process further comprising winding up said composite two layer structure on said windup roll unit to form a laminated filter unit component, said given velocity being such that said structure is wound up to form said filter unit component within a sufficiently short time interval after said charging step so that dissipation of the charge condition of said sheet below effective filtering levels is prevented, all of said positions lying in said zone of controlled conditions, and said sheet of dielectric material being engaged and supported in said zone by means maintained at the same electrical potential as said negative electrode and engaging only said other surface thereof having the negative electrostatic charge, the ratio of said predetermined thickness of said dielectric sheet to said predetermined thickness of said gas pervious web controlled in accordance with the ratio of the dielectric constant of said dielectric material to the dielectric constant of air such that in the laminated structure of the filter unit component, a stabilizing action is exerted on the charges of said sheet to minimize dissipation and discharge and to increase the density of the charges thereon, said method further comprising removing said laminated filter unit component from said zone.

2. An apparatus for fabricating a laminated electrostatic component of improved charge capacity and charge stability, said component comprising alternating dielectric layers and gas pervious spacer layers, said dielectric layers each having a length and a width each significantly greater than its thickness, each layer having two major surfaces defined generally the length and width of said layer, each of said layers having a positive electric charge of high density on one of its major surfaces and in said layer adjacent said one major surface, and each said layer also having a negative electrostatic charge of high density on its other opposed major surface and in the layer adjacent said other major surface, said apparatus comprising in combination; a support structure, a driving means mounted on said structure for continuously moving under tension, at a given velocity, an elongated sheet having two opposed major surfaces, and a predetermined thickness, such sheet formed of a given dielectric material with a given dielectric constant, in a zone of controlled temperature, pressure, and humidity conditions, in a given path from a first position through a second position to a third position, an electrical charging means mounted on said structure and comprising two closely spaced electrode elements at said second position, said drive means comprising bearing means for maintaining one of said sheet major surfaces of a sheet moving along said path in engagement with one of said electrode elements at said second position and maintaining the other surface of such a sheet in close proximity with said other electrode element, said electrical charging means comprising means operatively connected to said electrode elements for applying a predetermined high D.C. voltage across said electrode elements, said given dielectric material, said tension, said given velocity, said predetermined voltage, and the engagement of said electrode elements with said sheet cooperating to establish a positive electrical charge of high density on said one major surface of a sheet moving along said path and in such sheet material adjacent said one surface, and to establish a negative electrical charge of high density on the other major surface of such a sheet and in such sheet material adjacent said other surface, said apparatus driving means constructed and arranged to move such a charged sheet from said third position through a fourth position, said driving means comprising a windup roll unit at said fourth position for receiving a charged sheet, a supply means on said structure for simultaneously directing an elongated web of a predetermined thickness and gas pervious construction from a supply point at said given velocity into engagement with said other major surface of a dielectric sheet moving along said path to form a composite two layer laminated structure at said fourth position, said windup unit constructed and arranged to receive and wind up such a composite two layer structure on said windup roll unit to form a laminated filter unit component, said driving means controllable to maintain said given velocity such that such a laminated structure is wound up to form said component within a sufficiently short time interval after charging so that dissipation of the charge condition of a sheet below effective filtering levels is prevented, all of said positions lying in said zone of controlled conditions, and a sheet of dielectric material moving along said path being engaged and supported in said zone by said bearing means, said bearing means maintained at the same electrical potential as said negative electrode and engaging only said other surface thereof having the negative electrostatic charge.

References Cited

UNITED STATES PATENTS

| | | | |
|---|---|---|---|
| 2,422,825 | 6/1947 | Davis | 55—521X |
| 2,650,672 | 9/1953 | Barr et al. | 55—142X |
| 3,200,313 | 8/1965 | Nelson | 317—262(A) |
| 3,208,131 | 9/1965 | Ruff et al. | 29—1163.5(F)X |
| 3,303,401 | 2/1967 | Naumann et al. | 317—262(A) |
| 3,316,620 | 5/1967 | Stewart | 29—592 |
| 3,420,429 | 1/1969 | Lewis et al. | 29—203 |
| 3,466,733 | 9/1969 | Pajak et al. | 29—455 |

FOREIGN PATENTS

| | | | |
|---|---|---|---|
| 9,228 | 9/1911 | Great Britain | 29—163.5(F) |

CHARLIE T. MOON, Primary Examiner

U.S. Cl. X.R.

29—163.5, 203, 455, 33; 317—262